United States Patent [19]
Komiya et al.

[11] Patent Number: 6,037,437
[45] Date of Patent: Mar. 14, 2000

[54] METHOD FOR PRODUCING AN AROMATIC POLYCARBONATE

[75] Inventors: Kyosuke Komiya; Kazumi Hasegawa, both of Kurashiki, Japan

[73] Assignee: Asahi Kasei Kogyo Kabushiki Kaisha, Osaka, Japan

[21] Appl. No.: 08/987,053

[22] Filed: Dec. 9, 1997

[30] Foreign Application Priority Data

Dec. 9, 1996 [JP] Japan .................................. 8-328305

[51] Int. Cl.⁷ .................................................. C08G 64/00
[52] U.S. Cl. ........................... 528/199; 525/462; 525/469; 528/200
[58] Field of Search ..................................... 525/462, 469; 528/198, 199, 200, 219

[56] References Cited

U.S. PATENT DOCUMENTS 5,519,106  5/1996  Nukui et al. .............................. 528/199

FOREIGN PATENT DOCUMENTS 0 615996  9/1994  European Pat. Off. .
6-56984   3/1994  Japan .
6-345860  12/1994  Japan .

Primary Examiner—Robert Dawson
Assistant Examiner—D. Aylward
Attorney, Agent, or Firm—Birch, Stewart, Kolasch & Birch, LLP

[57] ABSTRACT

A method for producing an aromatic polycarbonate which comprises subjecting to a transesterification polymerization reaction at least one polymerizable material selected from a molten monomer mixture of an aromatic dihydroxy compound and a diaryl carbonate, and a molten prepolymer obtained from the monomer mixture, wherein the transesterification reaction is performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, and wherein a molten aromatic polycarbonate having a number average molecular weight of less than 2,500 is passed through the pipe or pipes at a velocity of 0.05 m/sec. or more and a molten aromatic polycarbonate having a number average molecular weight of 2,500 or more is passed through the pipe or pipes at a velocity of 0.005 m/sec. or more. By the method of the present invention, a high quality aromatic polycarbonate which is not only highly colorless but also has a low foreign matter content can be produced by using an ordinary pipeline system comprising the pipe or pipes made of an ordinary material.

7 Claims, 1 Drawing Sheet

METHOD FOR PRODUCING AN AROMATIC POLYCARBONATE

BACKGROUND OF THE INVENTION

1. Field of the Invention

The present invention relates to a method for producing an aromatic polycarbonate. More particularly, the present invention is concerned with a method for producing an aromatic polycarbonate which comprises subjecting to a transesterification polymerization reaction at least one polymerizable material selected from the group consisting of a molten monomer mixture of an aromatic dihydroxy compound and a diaryl carbonate, and a molten prepolymer obtained by reacting an aromatic dihydroxy compound with a diaryl carbonate, wherein the transesterification polymerization reaction is performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, and wherein molten aromatic polycarbonates respectively having a number average molecular weight of less than 2,500 and a number average molecular weight of 2,500 or more are passed through the pipe or pipes at velocities of specific values or more, respectively. The method of the present invention is advantageous not only in that a high quality aromatic polycarbonate which is not only highly colorless, but also has a low foreign matter content can be easily produced by using an ordinary pipeline system comprising one or more pipes made of an ordinary material, but also in that there is no need for a step of forcibly passing a molten poly-carbonate (inherently having a high melt viscosity) through a polymer filter by using an extruder, so that problems do not arise, such as clogging of the polymer filter or an increase in load on the extruder.

2. Discussion of Prior Art

In recent years, aromatic polycarbonates have been widely used in various fields as engineering plastics having excellent heat resistance, impact resistance and transparency. Use of aromatic polycarbonates has been rapidly expanding especially as a material for an optical disk substrate. With respect to methods for producing aromatic polycarbonates, various studies have heretofore been made. Of the methods studied, a process utilizing an interfacial polycondensation between an aqueous alkali solution of an aromatic dihydroxy compound, such as 2,2'-bis(4-hydroxyphenyl) propane (hereinafter, frequently referred to as "bisphenol A"), and phosgene in the presence of an organic solvent has been commercially practiced. The organic solvent used for the above-mentioned interfacial polycondensation process is a halogen-containing organic solvent, such as methylene chloride or chlorobenzene. Of these, methylene chloride is usually used.

However, the interfacial polycondensation process has a problem in that difficulties are encountered in separating and removing the organic solvent from the obtained polymer. Therefore, due to the presence of a halogen derived from the remaining organic solvent, problems arise not only in that corrosion occurs in the mold used for the molding of the obtained aromatic polycarbonate, but also in that the obtained aromatic polycarbonate suffers a discoloration, leading to a lowering in quality of the aromatic polycarbonate. Especially when the obtained aromatic polycarbonate is used for an optical disk substrate, the interfacial polycondensation process has a fatal problem in that the remaining halogen in the polycarbonate causes corrosion of the recording layer of such optical disk, thus causing an error in the recorded information.

With respect to a method for producing an aromatic polycarbonate from an aromatic dihydroxy compound and a diaryl carbonate, in a conventionally known melt transesterification process, an aromatic polycarbonate is produced by a transesterification polymerization reaction between bisphenol A and diphenyl carbonate in the molten state, while removing a by-produced phenolic compound (phenol). Unlike the interfacial polycondensation process, the melt transesterification process has an advantage in that a solvent need not be used. However, the melt transesterification process has a serious problem in that the produced polycarbonate contains foreign matter as an impurity. The reason for the presence of such foreign matter in the produced polycarbonate has not been elucidated yet, especially as to whether it is generated during the reaction or it is inadvertently introduced through the raw materials or through the materials of the production equipment. It has generally been attempted to remove the foreign matter from the obtained polycarbonate. However, since the viscosity of a molten polycarbonate is high, it is difficult to remove the foreign matter, especially foreign matter particles having an extremely small size, from the polycarbonate. When the obtained aromatic polycarbonate is used in the optical application field, especially in the production of an optical disk, the presence of extremely small foreign matter particles contained in the polycarbonate creates a serious optical defect, causing a bit-error in optically reading information recorded on a shaped article produced from the polycarbonate.

On the other hand, it is known that discoloration of a polycarbonate is greatly influenced by the material of a portion of the reaction equipment (such as a reactor, a pipe and the like) which is brought into contact with a molten polymer (such a portion is hereinafter, frequently referred to as a "molten polymer-contacting portion"). Also, it has been pointed out that, when a reactor made of stainless steel is used in producing a polycarbonate, a discoloration of the polycarbonate inevitably occurs. Therefore, it has been proposed to use a reactor produced from a material other than stainless steel. For example, U.S. Pat. No. 4,383,092 proposes a method in which tantalum, nickel or chromium is used as a material for a reactor in order to prevent the polycarbonate from suffering discoloration. Unexamined Japanese Patent Application Laid-Open Specification Nos. 4-72327 and 4-88017 propose reactors, respectively, made of a material having a chromium content or nickel content of 85% by weight or more, and a material having an iron content of 20% by weight or less. However, the materials disclosed in these patent documents have problems in that, due to their low iron content, these materials are not easily available and have poor workability or machinability.

To alleviate the above-mentioned problems, various attempts have been made. For example, Unexamined Japanese Patent Application Laid-Open Specification No. 6-345860 discloses a method in which a polymerization is performed in a two-stage process comprising a prepolymerization and a main polymerization, wherein, as a material for a molten polymer-contacting portion of the reaction equipment, a material having an iron content of 20% by weight or less is used in the prepolymerization stage and a material having an iron content of more than 20% by weight is used in the main polymerization stage. In this method (in which the use of a material having an iron content of 20% by weight or less is limited to the prepolymerization stage), the use of a material having a low iron content can be reduced. However, in this method, it is requisite to use a material having an iron content of 20% by weight or less for the entire region of the molten polymer-contacting portion of the reaction equipment employed in the prepolymerization stage. This requirement still poses great problems since such material having a low iron content is not easily available and has poor workability or the like.

Unexamined Japanese Patent Application Laid-Open Specification Nos. 4-7328 and 4-7329 propose an improved method of using stainless steel as a material for a reactor. Specifically, in this method, the surface of the stainless steel, which contacts the molten polymer, is subjected to buffing and/or acid washing. However, this method using buffing and/or acid washing cannot satisfactorily prevent the discoloration of a produced polycarbonate.

In Unexamined Japanese Patent Application Laid-Open Specification No. 6-56984, the present inventors previously proposed a production method for a polycarbonate, using a stainless steel reactor, wherein a molten polymer-contacting portion has been treated with a cleaning liquid comprising an aromatic monohydroxy compound. This method has enabled a desired polycarbonate to be produced with a reduction in discoloration. However, this prior art document has no teaching or suggestion about how to produce a polycarbonate which is free of the above-mentioned foreign matter. As a method for producing an aromatic polycarbonate with a low foreign matter content by the melt transesterification process, Unexamined Japanese Patent Application Laid-Open Specification No. 5-239334 (corresponding to EP 615996 A1) discloses a method in which an aromatic dihydroxy compound and a carbonic diester are subjected to a melt transesterification in the presence of a catalyst to obtain a polycarbonate in the molten state, and additives are added to and kneaded with the obtained molten polycarbonate before solidification thereof, and, optionally, the resultant kneaded polycarbonate composition is subjected to filtration by using a polymer filter, to thereby obtain a polycarbonate having a low foreign matter content, which can be used for producing optical articles. (In this method, the addition of additives before solidification of the obtained molten polycarbonate is intended to reduce the chance of occurrence of foreign matter by reducing the number of times that the obtained polycarbonate is melted.) However, this method has a problem in that, although the content of foreign matter having a relatively large particle diameter, namely, 1 µm or more, can be reduced, the content of foreign matter having a particle diameter as small as less than 1 µm cannot be satisfactorily reduced. Moreover, it is economically and practically disadvantageous to use a high precision polymer filter having a filtration cut-off size of less than 1 µm; the reasons for this reside in that, when a molten polycarbonate (inherently having a high melt viscosity) is forcibly passed through such a high precision filter by using an extruder, the load sustained on the extruder is extremely large, and also that such high precision filter is likely to be clogged. In fact, the polymer filter used in the working examples of the above-mentioned patent document has a filtration cut-off size larger than 5 µm, and there is no description therein concerning the content of foreign matter having a size smaller than 1 µm.

Unexamined Japanese Patent Application Laid-Open Specification No. 6-234845 (corresponding to U.S. Pat. No. 5,525,701) discloses a method in which an aromatic dihydroxy compound and a carbonic diester are subjected to a successive melt transesterification by using at least two reactors which are connected in series, wherein each of the final reactor and a reactor immediately preceding the final reactor has at least one polymer filter provided at an outlet thereof. However, in this method, the polymer filter equipped at the outlet of the final reactor has a filtration cut-off size of 5 µm or more, so that the content of foreign matter having a size of less than 1 µm cannot be reduced.

Unexamined Japanese Patent Application Laid-Open Specification No. 7-207015 teaches that, when an aromatic dihydroxy compound and a diaryl carbonate are subjected to melt transesterification in the presence of lithium phthalimide, side reactions can be suppressed, so that suppression can be achieved to some extent with respect to the formation of foreign matter which is generated by a branching reaction and is insoluble in a solvent, such as methylene chloride. By this method, the content of foreign matter having a size of 1 µm or more can be reduced; however, by this method, the content of foreign matter having a size of less than 1 µm cannot be reduced to a satisfactorily low level.

As is apparent from the above, a method is not known at all which can be used for producing a transesterified polycarbonate in which the content of extremely small foreign matter having a size of less than 1 µm is reduced to a satisfactorily low level.

SUMMARY OF INVENTION

The present inventors have conducted extensive and intensive studies with a view toward solving the above-mentioned problems accompanying the prior art. As a result, it has unexpectedly been found that, in a method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, wherein the transesterification polymerization reaction is performed in one or more polymerizers which is or are connected through a pipeline system toward an outlet for a final aromatic polycarbonate product, and wherein the pipeline system comprises one or more pipes through which a molten aromatic polycarbonate having a number average molecular weight increased by the transesterification polymerization reaction is passed while contacting an inner wall of the pipe or pipes, the above-mentioned problems can be solved by passing a molten aromatic polycarbonate having a number average molecular weight of less than 2,500 through the pipe or pipes at a velocity of 0.05 m/sec. or more and passing a molten aromatic polycarbonate having a number average molecular weight of 2,500 or more through the pipe or pipes at a velocity of 0.005 m/sec. or more.

Based on this novel finding, the present invention has been completed.

It is, therefore, a primary object of the present invention to provide a method which can be used for producing a high quality aromatic polycarbonate which is not only highly colorless, but also has a low foreign matter content by using an ordinary pipeline system comprising one or more pipes made of an ordinary material, and without causing problems, such as clogging of the polymer filter and an increase in load on the extruder.

The foregoing and other objects, features and advantages of the present invention will become apparent from the following detailed description and appended claims taken in connection with the accompanying drawing.

DESCRIPTION OF REFERENCE NUMERALS (FIG. 1)

Figure 1:
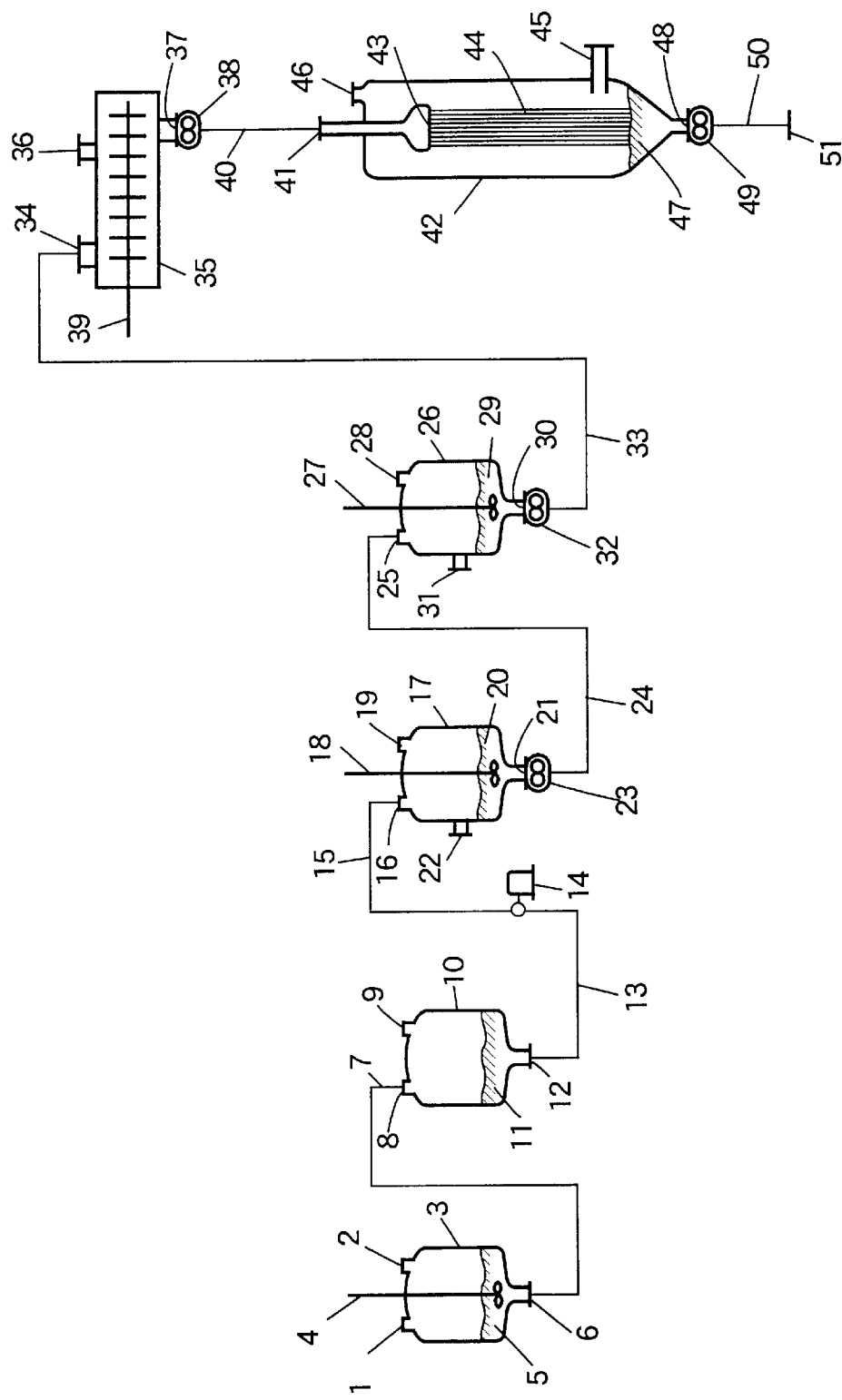
FIG. 1 is a diagram showing the system employed for producing an aromatic polycarbonate in Example 1.

1: Inlet for a polymerizable material
2, 9, 19, 28, 36, 46: Vent
3: First vertical agitation type polymerizer vessel
4, 18, 27, 39: Agitator
5, 11, 20, 29, 47: Molten polymer
6, 12, 21, 30, 37, 48: Outlet
7, 13, 15, 24, 33, 40, 50: Pipe
8, 16, 25, 34, 41: Inlet
10: Storage vessel
14: Feed pump
23, 32, 38, 49: Discharge pump
17: Second vertical agitation type polymerizer vessel
22, 31, 45: Gas feed port
26: Third vertical agitation type polymerizer vessel
35: Horizontal agitation type polymerizer vessel
42: Main body of wire-wetting fall polymerizer
43: Perforated plate
44: Wire
51: Outlet

DETAILED DESCRIPTION OF THE INVENTION

According to the present invention, there is provided a method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, the transesterification polymerization reaction being performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, and wherein a molten aromatic polycarbonate having a number average molecular weight of less than 2,500 is passed through the pipe or pipes at a velocity of 0.05 m/sec. or more and a molten aromatic polycarbonate having a number average molecular weight of 2,500 or more is passed through the pipe or pipes at a velocity of 0.005 m/sec. or more.

For easy understanding of the present invention, the essential features and various preferred embodiments of the present invention are enumerated below.

1. In a method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, the transesterification polymerization reaction being performed in one or more polymerizers which is or are connected through a pipeline system toward an outlet for a final aromatic polycarbonate product, wherein the pipeline system comprises one or more pipes through which a molten aromatic polycarbonate having a number average molecular weight increased by the transesterification polymerization reaction is passed while contacting an inner wall of the pipe or pipes, the improvement which comprises passing a molten aromatic polycarbonate having a number average molecular weight of less than 2,500 through the pipe or pipes at a velocity of 0.05 m/sec. or more and passing a molten aromatic polycarbonate having a number average molecular weight of 2,500 or more through the pipe or pipes at a velocity of 0.005 m/sec. or more.

2. The method according to item 1 above, wherein the inner wall of the pipe(s) is made of a material having an iron content of 20% by weight or more.

3. The method according to item 1 or 2 above, wherein the surface of the inner wall of the pipe(s) is washed with a liquid comprising an aromatic monohydroxy compound.

4. The method according to item 3 above, wherein the aromatic monohydroxy compound is phenol.

5. The method according to item 3 above, wherein the liquid is an aqueous solution or an organic solvent solution containing at least 10% by weight of an aromatic monohydroxy compound.

Hereinbelow, the present invention will be described in more detail.

Conventionally, it has been presumed that the main cause of the discoloration of an aromatic polycarbonate resides in that a phenolic compound, such as phenol or bisphenol, is brought into contact, at high temperatures, with the surface of reaction equipment made of a metallic material having an iron content of 20% by weight or more. Therefore, it has been believed that the discoloration of an aromatic polycarbonate cannot be suppressed without either avoiding the use of such metallic material (having a high iron content) or subjecting the surface of such metallic material to some treatment (using, e.g., a cleaning liquid comprising an aromatic monohydroxy compound). With respect to the problem that a polycarbonate produced by a melt transesterification process contains foreign matter as an impurity, the reason for the presence of such foreign matter has not been known, including whether it is generated during the reaction or it is inadvertently introduced through the raw materials or through the materials of the production equipment. It has been attempted to remove the foreign matter from the obtained polycarbonate by using a polymer filter.

However, the present inventors have for the first time found that both the occurrence of the discoloration problem and the occurrence of the foreign matter problem have a close relationship to the velocity at which a molten aromatic polycarbonate is passed through the pipe(s) of a pipeline system used in a transesterification polymerization reaction, and that both the discoloration problem and the foreign matter problem can be solved by passing molten aromatic polycarbonates respectively having a number average molecular weight of less than 2,500 and a number average molecular weight of 2,500 or more through the pipe(s) at respective, specific, relatively high velocities.

Complete elucidation of the mechanisms of the occurrence of the discoloration and foreign matter problems has not yet been made. However, in view of the fact that both the discoloration and foreign matter problems can be solved by employing specific, relatively high velocities in passing molten aromatic polycarbonates though the pipe(s) of a pipeline system, it is presumed that the discoloration and foreign matter problems occur when a molten polymer experiences stagnation while being passed through the pipe(s) of a pipeline system.

In the present invention, the terminology "aromatic dihydroxy compound" means a compound represented by the following formula:

HO—Ar—OH wherein Ar represents a divalent aromatic group.

Preferred examples of divalent aromatic groups as Ar include a group represented by the following formula:

wherein each of $Ar^1$ and $Ar^2$ independently represents a divalent carbocyclic or heterocyclic aromatic group having from 5 to 70 carbon atoms, and Y represents a divalent alkane group having from 1 to 30 carbon atoms.

In divalent aromatic groups $Ar^1$ and $Ar^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Illustrative examples of heterocyclic aromatic groups include an aromatic group having at least one hetero atom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane group Y include organic groups respectively represented by the following formulae:

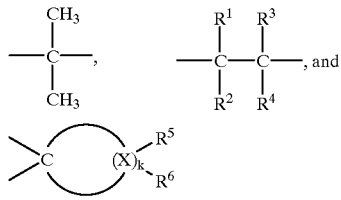

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms, wherein $R^5$ and $R^6$ are the same or different;

wherein at least one hydrogen atom of each of $R^1$, $R^2$, $R^3$, $R^4$, $R^5$ and $R^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Specific examples of divalent aromatic group Ar include groups respectively represented by the following formulae:

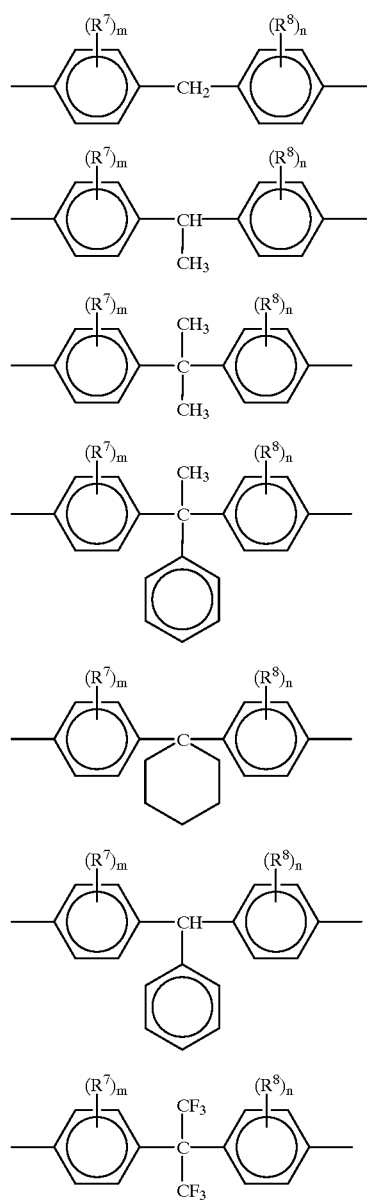

-continued

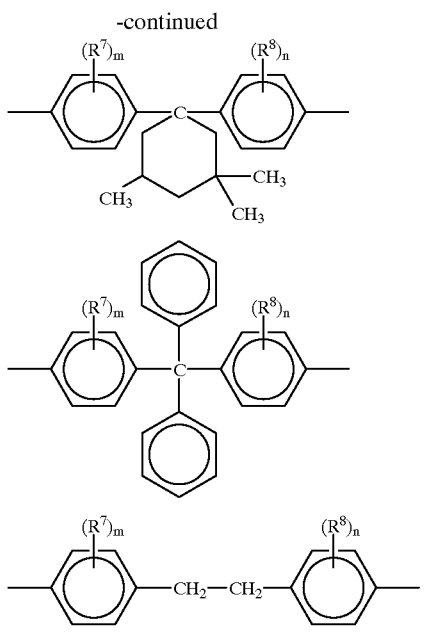

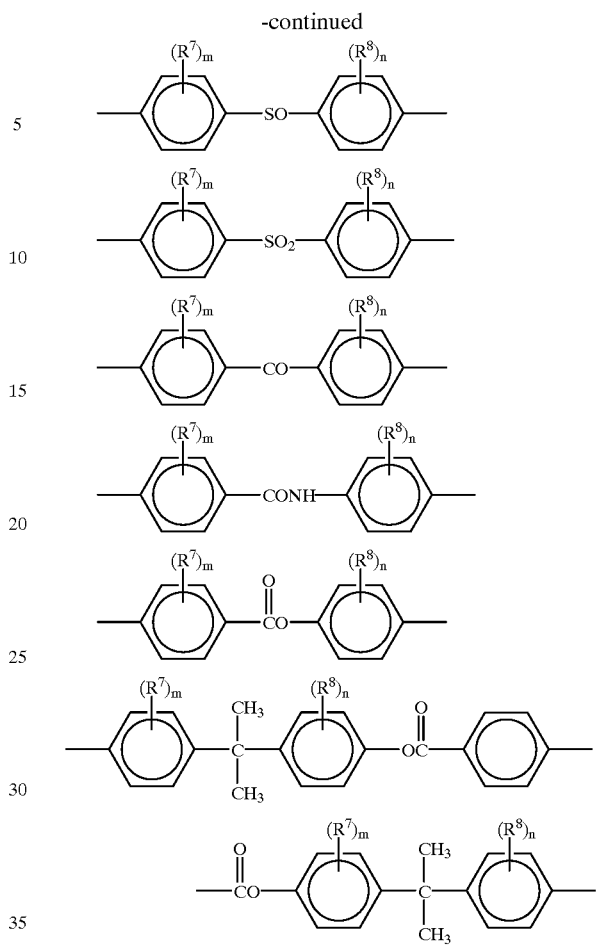

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$ 's are the same or different.

Further, examples of divalent aromatic group Ar also include those which are represented by the following formula:

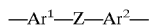

$$-Ar^1-Z-Ar^2-$$

wherein $Ar^1$ and $Ar^2$ are as defined above; and

Z represents a single bond or a divalent group, such as —O—, —CO—, —S—, —SO$_2$—, —SO—, —COO—, or —CON($R^1$)—, wherein $R^1$ is as defined above.

Examples of divalent aromatic group Ar include groups respectively represented by the following formulae:

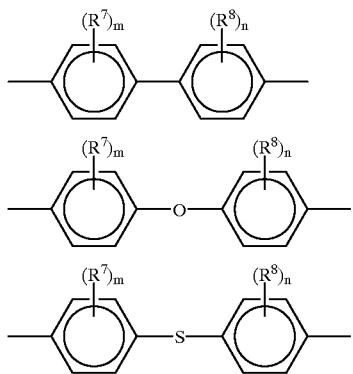

wherein $R^7$, $R^8$, m and n are as defined above.

Further examples of divalent aromatic group Ar include an unsubstituted or substituted phenylene, an unsubstituted or substituted naphthylene, and an unsubstituted or substituted pyridylene.

In the method of the present invention, the aromatic dihydroxy compounds can be used individually or in combination. Representative examples of aromatic dihydroxy compounds include bisphenol A.

The diaryl carbonate used in the present invention is represented by the following formula:

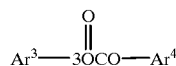

wherein each of $Ar^3$ and $Ar^4$ independently represents a monovalent aromatic group.

Each of $Ar^3$ and $Ar^4$ independently represents a monovalent carbocyclic or heterocyclic aromatic group. At least one hydrogen atom of each of $Ar^3$ and $Ar^4$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group.

Preferred examples of monovalent aromatic groups $Ar^3$ and $Ar^4$ are those respectively represented by the following formulae:

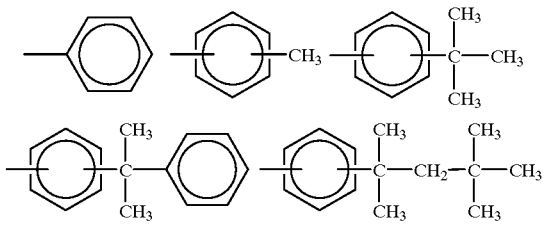

Representative examples of diaryl carbonates include a substituted or unsubstituted diphenyl carbonate compound represented by the following formula:

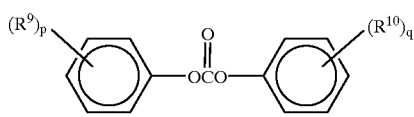

wherein each of $R^9$ and $R^{10}$ independently represernts a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diphenyl carbonate compounds, preferred are diaryl carbonates having a symmetrical configuration, such as (unsubstituted) diphenyl carbonate and a diphenyl carbonate substituted with a lower alkyl group, e.g., ditolyl carbonate and di-t-butylphenyl carbonate. Particularly preferred is diphenyl carbonate, which is the diaryl carbonate having the simplest structure.

These diaryl carbonates may be used individually or in combination.

The ratio in which the aromatic dihydroxy compound and the diaryl carbonate are used (i.e., the charging ratio) may vary depending on the types of the aromatic dihydroxy compound and diaryl carbonate employed, the polymerization temperature and other polymerization conditions. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

The number average molecular weight of the aromatic polycarbonate obtained according to the method of the present invention is generally from 5,000 to 100,000, preferably from 5,000 to 30,000.

In the present invention, the production of an aromatic polycarbonate is conducted by a transesterification process which is a process wherein a condensation polymerization of the polymerizable material is performed by transesterification in the molten state while heating in the presence or absence of a catalyst under reduced pressure, under an inert gas flow or under both reduced pressure and an inert gas flow. The mode of the polymerization equipment and the like are not specifically limited. Examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer having a perforated plate, and a wire-wetting fall polymerizer having a perforated plate and at least one wire provided in association with the perforated plate. These various types of reactors can be used individually or in combination. The method of the present invention can be practiced in any of a batchwise manner and a continuous manner. In the method of the present invention, if desired, an extruder, a polymer mixer and the like may be employed in combination with the polymerizer(s) to be used, wherein any of the extruder, polymer mixer and the like can be suitably used for adding additives, such as a stabilizer and the like, just after completion of the polymerization while the polycarbonate still remains in the molten state.

With respect to materials for constructing these polymerizers used in the present invention, there is no particular limitation. However, stainless steel, nickel or glass is generally used as a material for at least the inner walls of the polymerizers. In the present invention, as the material for at least the inner wall of the polymerizer which is used in the early stage of the polymerization, a material having an iron content of less than 20% by weight can be employed. Examples of materials having an iron content of less than 20% by weight include nickel, glass, Inconel 600, Hastelloy C-276 and the like. As the material for at least the inner wall of the polymerizer which is used in the later stage of the polymerization, a material having an iron content of 20% by weight or more can be employed. Examples of materials having an iron content of 20% by weight or more include stain-less steel, such as SUS304, SUS304L, SUS316 and SUS316L.

In the present invention, the transesterification polymerization reaction temperature is generally in the range of from 50 to 350° C., preferably from 100 to 300° C.

As the reaction proceeds, an aromatic monohydroxy compound is by-produced. By removing the aromatic monohydroxy compound from the reaction system, the reaction rate can be increased. Therefore, in the method of the present invention, it is preferable to employ a method in which an inert gas which does not adversely affect the reaction, such as nitrogen, argon, helium, carbon dioxide and a lower hydrocarbon gas, is introduced so that the by-produced aromatic monohydroxy compound is entrained by the inert gas, and the inert gas entraining the aromatic monohydroxy compound is withdrawn to remove the aromatic monohydroxy compound, or a method in which the reaction is carried out under reduced pressure. The above two methods can be used individually or in combination.

A suitable reaction pressure is selected depending on the molecular weight of the aromatic polycarbonate in the reaction system. When the number average molecular weight of the polycarbonate in the reaction system is less than 1,000, a reaction pressure in the range of from 50 mmHg to atmospheric pressure is generally employed. When the number average molecular weight of the polycarbonate in the reaction system is in the range of from 1,000 to 2,000, a reaction pressure in the range of from 3 mmHg to 80 mmHg is generally employed. When the number average molecular weight of the polycarbonate in the reaction system is more than 2,000, a reaction pressure of 10 mmHg or less, preferably 5 mmHg or less is generally employed.

The transesterification reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an arylene group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula:

$(R^1 R^2 R^3 R^4)PB(R^1 R^2 R^3 R^4)$, wherein $R^1 R^2 R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts used is generally in the range of from $10^{-8}$ to 1% by weight, preferably from $10^{-7}$ to $10^{-1}$% by weight, based on the weight of the aromatic dihydroxy compound.

As mentioned above, in the present invention, the transesterification polymerization reaction is performed in one or more polymerizers which is or are connected through a pipeline system. The pipeline system comprises one or more pipes through which a molten aromatic polycarbonate having a number average molecular weight increased by said transesterification polymerization reaction is passed while contacting an inner wall of the pipe(s). For example, the pipe(s) is or are utilized: for transferring a molten aromatic polycarbonate from a polymerizer to another polymerizer; for discharging the final aromatic polycarbonate from the final polymerizer; or for transferring the final aromatic polycarbonate to a polymer mixer, an extruder or the like, while the final aromatic polycarbonate is in a molten state. In the present invention, the terminology "the molten aromatic polycarbonate" not only means a final, molten aromatic polycarbonate to be produced by the method of the present invention, but also means a molten prepolymer which is a polycondensate obtained by a process of reacting an aromatic dihydroxy compound with a diaryl carbonate and which has a lower molecular weight than the molecular weight of the final aromatic polycarbonate.

For achieving the excellent effects of the method of the present invention, there is no particular limitation with respect to the material for the inner wall of the pipe(s), which is in contact with the molten aromatic polycarbonate during the transesterification polymerization reaction; however, it is preferred to use a material having an iron content of 20% by weight or more from the viewpoint of availability and processability (such as ease in the cutting operation and welding operation). On the other hand, with respect to a material having an iron content of less than 20% by weight, although such a special material has conventionally been used as a material which can be advantageous for obtaining a polycarbonate which is not only highly colorless, but also has a low foreign matter content, such a special material is not easily available and is poor with respect to processability. In the present invention, it is not necessary to use such a special material for obtaining the above-mentioned high quality aromatic polycarbonate. That is, in the method of the present invention, a high quality aromatic polycarbonate which is not only highly colorless, but also has a low foreign matter content can be easily produced by using an ordinary pipeline system, in which an ordinary material (i.e., a material having an iron content of 20% by weight or more) is used as the material for the inner wall of the pipe(s).

With respect to the materials having an iron content of 20% by weight or more, there is no particular limitation; however, it is preferred to use a material containing nickel and/or chromium as components other than iron.

Examples of materials having an iron content of 20% by weight or more include SS (iron content: 100 weight %); stainless steels as defined in "Sutenresukou Binran (Stainless Steel Handbook)", pages 13 to 21, published by The Nikkan Kogyo Shimbun Ltd., Japan, 1976 (which generally has a chromium content of from 10 to 30 weight %), such as martensite, ferrite, austenite and ferrite-austenite; and a super alloy of iron as shown in the Table which appears at page 547 of the above-mentioned "Sutenresukou Binran (Stainless Steel Handbook)".

More specific examples of materials having an iron content of 20% by weight or more include SUS201, SUS202, SUS304, SUS304 L, SUS316, SUS316 L, SUS347, SUS405, SUS430, SUS403, SUS410, SUS431, SUS440 C, SUS630, Incolloy 800, Incolloy 801, Incolloy 802, Incolloy 807, Incolloy 901, LCN 155, W 545, V 57, W 545, D 979, CG 27 and S 590. Of these, SUS304, SUS304 L, SUS316 and SUS316 L are preferred, and SUS316 L is especially preferred. The above-mentioned materials having an iron content of 20% by weight or more can be used individually or in combination.

In the present invention, the pipe used in the pipeline system may be plated, flame spray-coated or clad. Further, with respect to the pipe, the inner wall thereof (which is in contact with the molten aromatic polycarbonate during the transesterification reaction) may be made of a material having an iron content of less than 20% by weight, such as nickel, Inconel 600 and Inconel 657.

In the present invention, the velocity at which a molten aromatic polycarbonate having a number average molecular weight ($\overline{Mn}$) of less than 2,500 is passed through the pipe(s), is 0.05 m/sec. or more, preferably 0.1 m/sec. or more, more preferably 0.2 m/sec. or more. When the velocity is less than 0.05 m/sec., disadvantages are caused such that when use is made of a pipe-line system in which the inner wall of the pipe(s) is made of a material having an iron content of 20% by weight or more, the final aromatic polycarbonate suffers discoloration. With respect to the upper limit of the velocity of the polymer having an $\overline{Mn}$ of less than 2,500, there is no particular limitation as long as the internal pressure of the pipe(s) can be maintained at a practically employable level; however, generally, the velocity is 10 m/sec. or less, preferably 4 m/sec. or less.

On the other hand, the velocity at which a molten aromatic polycarbonate having an $\overline{Mn}$ of 2,500 or more is passed through the pipe(s), is 0.005 m/sec. or more, preferably 0.01 m/sec. or more, more preferably 0.015 m/sec. or more. When the velocity of the polymer having an $\overline{Mn}$ of 2,500 or more is less than 0.005 m/sec., disadvantages are caused such that when use is made of a pipeline system in which the inner wall of the pipe(s) is made of a material having an iron content of 20% by weight or more, the final aromatic poly-carbonate has a high foreign matter content. With respect to the upper limit of the velocity of the polymer having an $\overline{Mn}$ of 2,500 or more, there is no particular limitation as long as the internal pressure of the pipe(s) can be maintained at a practically employable level; however, generally, the velocity is 4 m/sec. or less, preferably 1 m/sec. or less.

With respect to actuating means for causing a molten aromatic polycarbonate having a number average molecular weights of less than 2,500 to pass through a pipeline system at a velocity of 0.05 m/sec. or more and for causing a molten aromatic polycarbonate having a number average molecular weight of 2,500 or more to pass through a pipeline system at a velocity of 0.005 m/sec. or more as defined in the present invention, there is no particular limitation. Examples of actuating means for causing molten aromatic polycarbonates to pass through a pipeline system include a gear pump, a plunger pump, a screw pump, a centrifugal pump, a volute pump, a Moineau (Mohono) pump, a diaphragm pump and the like. As means for passing molten aromatic polycarbonates through a pipeline system, there can also be employed a pressurized inert gas.

The term "velocity" employed in the present invention means the linear velocity as expressed using a unit of m/sec., and the linear velocity of a molten polymer being passed through a pipe can be calculated by dividing the volume velocity (m$^3$/sec.) of the molten polymer by the cross-sectional area (m$^2$) of the pipe. Accordingly, even when the volume velocity of an aromatic polycarbonate being passed through a pipe cannot be changed, the linear velocity of the aromatic poly-carbonate in the pipe can be adjusted to a desired value within the range defined in the present invention by selecting an appropriate value for the cross-sectional area of the pipe.

With respect to the (total) length of the pipe(s), there is no particular limitation, as long as the (total) length of the pipe(s) is within a practically employable range. The (total) length of the pipe(s) to be employed is generally 200 m or less, preferably 100 m or less.

With respect to the morphology of the hollow portions of the pipe(s), there is no particular limitation. It is preferred that the molten aromatic poly-carbonate does not experience a stagnation in the pipe(s).

In the present invention, it is preferred that the surface of the inner wall of the pipe(s) is washed with a liquid comprising an aromatic monohydroxy compound represented by the formula Ar$^5$OH (wherein Ar$^5$ is the same as each of the above-mentioned Ar$^3$ and Ar$^4$).

Preferred examples of Ar$^5$ include the monovalent aromatic groups mentioned above as examples of Ar$^3$ and Ar$^4$. As Ar$^5$, phenol which has a simple structure is preferred.

In the present invention, the term "a liquid comprising an aromatic monohydroxy compound" means either a liquid consisting of an aromatic monohydroxy compound or an aqueous solution or an organic solvent solution containing from 10 ppm by weight or more, preferably from 100 ppm by weight or more, more preferably from 1000 ppm by weight or more of an aromatic monohydroxy compound, wherein, the organic solvent may be appropriately selected from those solvents which do not adversely affect the transesterification polymerization reaction and do not corrode reaction equipment, such as the pipe(s) and polymerizer (s). When an aromatic dihydroxy compound and a diaryl carbonate are subjected to a transesterification polymerization reaction to obtain a molten aromatic polycarbonate, an aromatic monohydroxy compound is by-produced, and the by-produced aromatic monohydroxy compound contained in the resultant reaction mixture, serves as the above-mentioned liquid (comprising an aromatic monohydroxy compound) for washing of the inner wall of the pipe(s).

With respect to the temperature for washing the surface of the inner wall of the pipe(s) with a liquid comprising an aromatic monohydroxy compound, there is no particular limitation. The washing temperature is generally selected in the range of from 20 to 300° C., preferably from 100 to 250° C.

With respect to the time for washing the surface of the inner wall of the pipe(s) with a liquid comprising an aromatic monohydroxy compound, there is no particular limitation. The washing time is generally selected in the range of from several minutes to several hundred hours, preferably from 1 to 100 hours.

With respect to the pressure for washing the surface of the inner wall of the pipe(s) with a liquid comprising an aromatic monohydroxy compound, there is no particular limitation. Any of a reduced pressure, an atmospheric pressure and a superatmospheric pressure can be employed individually or in combination.

With respect to the manner of conducting the washing operation using a liquid comprising an aromatic monohydroxy compound, there is no particular limitation. A batch-wise manner and a continuous manner can be employed individually or in combination.

It is especially preferred that not only the surface of the inner wall of the pipe(s), but also the inner wall surface of the polymerizer(s) is washed with a liquid comprising an aromatic monohydroxy compound is performed.

By the method of the present invention, an aromatic polycarbonate having a low foreign matter content can be easily produced. Therefore, in the present invention, there is no need for a step of forcibly passing a molten polycarbonate (inherently having a high melt viscosity) through a polymer filter by using an extruder, which step is necessarily conducted in conventional techniques for the removal of foreign matter. When a polymer filter is used, it is particularly preferred to incorporate the polymer filter in the transesterification polymerization reaction system in a manner such that a molten aromatic polycarbonate having a relatively low $\overline{Mn}$ is subjected to filtration for the removal of foreign matter. However, the polymer filter may be incorporated in the transesterification polymerization reaction system in a manner such that a molten aromatic polycarbonate having a relatively high molecular weight is subjected to filtration for the removal of foreign matter as long as the load on the extruder does not become too high. In the method of the present invention, the molten aromatic polycarbonate being polymerized inherently has a low foreign matter content. Therefore, even when the molten aromatic polycarbonate is subjected to filtration by means of a polymer filter, problems do not arise, such as clogging of the polymer filter and an increase in load on the extruder.

BEST MODE FOR CARRYING OUT THE INVENTION

The present invention will now be further illustrated in more detail with reference to the following Examples and Comparative Examples, which should not be construed as limiting the scope of the present invention.

In the following Examples and Comparative Examples, various properties were measured and evaluated as follows.

(1) Measurement of the Number Average Molecular Weight ($\overline{M}n$) of an Aromatic Polycarbonate:

The number average molecular weight of the produced aromatic polycarbonate was measured by gel permeation chromatography (GPC) (column: TSK-GEL, manufactured and sold by Tosoh Corp., Japan; solvent: tetrahydrofuran), utilizing the molecular weight conversion calibration curve obtained with respect to standard polystyrene samples each having a single molecular weight distribution, which calibration curve was obtained by the following formula:

$$M_{pc} = 0.3591 M_{PS}^{1.0388}$$

wherein $M_{pc}$ represents the molecular weight of the polycarbonate, and $M_{ps}$ represents the molecular weight of the standard polystyrene.

(2) Evaluation of the Color of a Polycarbonate:

The color of a polycarbonate was evaluated, using a test specimen having a width of 50 mmn, a length of 50 mm and a thickness of 3.2 mm, in accordance with the CIELAB method (Commission Internationale de 1' Eclairage 1976 L*a*b* Diagram), wherein the test specimen was obtained by a method in which a polycarbonate is subjected to continuous molding, using an injection molding machine (J100E, manufactured and sold by THE JAPAN STEEL WORKS. LTD., Japan), at a cylinder temperature of 300° C. and a mold temperature of 90° C. The yellowness of the specimen was expressed in terms of the b*-value.

(3) Measurement of the Amount of Foreign Matter Contained in an Aromatic Polycarbonate:

The content of the foreign matter (having an average particle size of from 0.5 to 1.0 μm) contained in the produced aromatic polycarbonate was measured by means of HIAC/ROYCO MODEL 346B (manufactured and sold by Pacific Scientific Ltd., England).

The measurement was conducted with respect to a solution of the aromatic polycarbonate in methylene chloride.

(4) Measurement of the Velocity of a Molten Aromatic Polycarbonate being Passed Through a Pipe:

The velocity of a molten aromatic polycarbonate being passed through a pipe was calculated by the following formula.

$$\text{Velocity} = V/S$$

wherein V (m³/sec.) represents the volume velocity of a molten aromatic polycarbonate being passed through the pipe and S represents the cross-sectional area of the pipe.

The volume velocity (V) was measured by means of a flow meter or determined by using a calibration curve prepared so as to show a relationship between the flow rate and the stroke rate or the revolution rate of the transfer pump.

EXAMPLE 1

An aromatic polycarbonate was produced by melt transesterification in accordance with a system as shown in FIG. 1. The system of FIG. 1 comprises a first stage, second stage and third stage agitation polymerization, and a wire-wetting fall polymerization.

In the first stage agitation polymerization, use was made of first agitation type polymerizer vessel 3 (having a capacity of 200 liters) which is equipped with an agitator 4 having anchor-type agitating blades. In the second stage agitation polymerization, use was made of second agitation type polymerizer vessels 17 and 26 (each having a capacity of 50 liters) which are respectively equipped with agitators 18 and 27 having anchor-type agitating blades. With respect to each of the above-mentioned agitation type polymerizer vessels, the inner wall thereof (which is in contact with the polymerizable material during the operation of the system of FIG. 1) is made of nickel.

With respect to storage vessel 10 disposed between first agitation type polymerizer vessel 3 and second agitation type polymerizer vessel 17, the inner wall surface thereof (which is in contact with the polymerizable material during the operation of the system of FIG. 1) is made of nickel.

In the third stage agitation polymerization, use was made of horizontal twin-screw agitation type polymerizer 35 (having a capacity of 30 liters, and an L/D ratio of 6) which is equipped with twin-screw agitator 39 having a rotation diameter of 140 mm. With respect to horizontal twin-screw agitation type polymerizer 35, the inner wall thereof (which is in contact with the polymerizable material during the operation of the system of FIG. 1) is made of SUS316 L.

In the wire-wetting fall polymerization, wire-wetting fall polymerizer 42 was used. Wire-wetting fall polymerizer 42 is equipped with a perforated plate 43 which has 50 holes having a diameter of 5 mm. The inner wall of wire-wetting fall polymerizer 42 (which is in contact with the polymerizable material during the operation of the system of FIG. 1) is made of SUS316 L. In wire-wetting fall polymerizer 42, 50 strands of 1 mmφ SUS 316 L wires 44 are hung vertically from the respective holes of perforated plate 43 to a reservoir portion at the bottom of wire-wetting fall polymerizer 42 so that a polymerizable material will not fall freely (not freefall) but fall along and in contact with the wires (wire-wetting fall). The wire-wetting fall distance is 8 m.

With respect to each of pipes 7, 13, 15, 24, 33, 40 and 50, the inner wall thereof (which is in contact with the polymerizable material during the operation of the system of FIG. 1) is made of SUS316 L.

Prior to the operation of the system of FIG. 1, the surface of the inner wall of each of the polymerizers, the storage vessels and the pipes was washed with phenol at 150° C.

The first stage agitation polymerization in first agitation type polymerizer vessel 3 was batchwise conducted, whereas the second stage agitation polymerization in second agitation type polymerizer vessels 17 and 26 and the wire-wetting fall polymerization in wire-wetting fall polymerizer 42 were continuously conducted.

The polymerization reaction conditions in first agitation type polymerizer vessel 3 were as follows: the reaction temperature was 180° C., the reaction pressure was atmospheric pressure, and the flow rate of nitrogen gas was 1 liter/hr.

In operation, 80 kg of polymerizable materials {i.e., bisphenol A as an aromatic dihydroxy compound and diphenyl carbonate as a diaryl carbonate (the molar ratio of diphenyl carbonate to bisphenol A: 1.10)} were charged together with 7 mg of sodium hydroxide as a catalyst into first agitation type polymerizer vessel 3. The monomer mixture in polymerizer vessel 3 was polymerized in a molten state for 5 hours while agitating, to thereby obtain a molten polymer 5 ($\overline{M}n$: 350). The whole of the obtained molten polymer 5 was transferred to storage vessel 10 through pipe 7 at a velocity of 0.09 m/sec. The volume velocity of the molten polymer was measured by means of a flow meter (not shown) provided in pipe 7. In storage vessel 10, the temperature was kept at 180° C. and the pressure was atmospheric pressure. From storage vessel 10, the molten polymer 11 was continuously fed to second agitation type polymerizer vessel 17 by means of a plunger pump 14 at a feeding rate of 10 kg/hr. The velocity of the molten polymer passed through pipes 13 and 15 was 0.1 m/sec.

While feeding molten polymer 11 to polymerizer vessel 17, polymerizer vessel 3 was operated again, so that the monomer mixture charged therein was polymerized in the same manner as mentioned above to produce a molten polymer ($\overline{M}n$ as measured at 300 hours after the start of the operation of the system of FIG. 1: 350), and the obtained molten polymer was transferred to storage vessel 10 at a velocity of 0.09 m/sec. before storage vessel 10 became empty.

With respect to the batchwise polymerization in first agitation type polymerizer vessel 3 and the feeding of molten polymer 11 to storage vessel 10, the same operation as mentioned above was successively repeated so as to feed molten polymer 11 continuously to polymerizer vessel 17.

The polymerization reaction conditions in second agitation type polymerizer vessel 17 were as follows: the reaction temperature was 235° C., and the reaction pressure was 100 mmHg. When the volume of the molten polymer 20 ($\overline{M}n$ as measured 300 hours after the start of the operation of the system of FIG. 1: 850) in second agitation type polymerizer vessel 17 reached 20 liters, it was started to feed the molten polymer 20 continuously to second agitation type polymerizer vessel 26 by means of a gear pump 23. The feeding rate of the molten polymer 20 to polymerizer vessel 26 was controlled so that the volume of molten polymer 20 in second agitation type polymerizer vessel 17 was constantly maintained at 20 liters. The velocity of the molten polymer 20 passed through pipe 24 was 0.08 m/sec.

The polymerization reaction conditions in second agitation type polymerizer vessel 26 were as follows: the reaction temperature was 250° C., the reaction pressure was 6 mmHg. When the volume of the molten polymer 29 ($\overline{M}n$ as measured 300 hours after the start of the operation of the system of FIG. 1: 2,400) in second agitation type polymerizer vessel 26 reached 20 liters, it was started to feed the molten polymer 29 to horizontal twin-screw agitation type polymerizer 35. The feeding rate of the molten polymer 29 to polymerizer 35 was controlled so that the volume of molten polymer in second agitation type polymerizer vessel 26 was constantly maintained at 20 liters. The velocity of the molten polymer 29 passed through pipe 33 was 0.06 m/sec.

The polymerization reaction conditions in horizontal twin-screw agitation type polymerizer 35 were as follows: the reaction temperature was 275° C., and the reaction pressure was 0.5 mmHg. When the volume of the molten polymer ($\overline{M}n$ as measured 300 hours after the start of the operation of the system of FIG. 1: 6,300) in horizontal twin-screw agitation type polymerizer 35 reached 10 liters, it was started to feed the molten polymer to wire-wetting fall polymerizer 42 by means of a gear pump 38. The feeding rate of the molten polymer to polymerizer 42 was controlled so that the volume of the molten polymer in horizontal twin-screw agitation type polymerizer 35 was constantly maintained at 10 liters. The velocity of the molten polymer passed through pipe 40 was 0.02 m/sec.

The polymerization reaction conditions in wire-wetting fall polymerizer 42 were as follows: the reaction temperature was 260° C., and the reaction pressure was 0.4 mmHg. When the volume of the molten polymer 47 ($\overline{M}n$ as measured 300 hours after the start of the operation of the system of FIG. 1: 10,500) at the bottom of wire-wetting fall polymerizer 42 reached 20 liters, it was started to withdraw the molten polymer 47 in the form of a strand from wire-wetting fall polymerizer 42 through pipe 50 and outlet 51 by means of a gear pump 49. The rate of the withdrawal of the molten polymer 47 was controlled so that the volume of the molten polymer 47 in wire-wetting fall polymerizer 42 was constantly maintained at 20 liters. The velocity of the molten polymer 47 passed through pipe 50 was 0.02 m/sec.

After 300 hours from the start of the polymerization operation, the strand withdrawn from wire-wetting fall polymerizer 42 through outlet 51 was cut into pellets by means of a strand cutter. With respect to the obtained aromatic polycarbonate pellets, various evaluations were made in accordance with the above-mentioned methods. As a result, the b* value of the aromatic polycarbonate was as small as 3.3, and the amount of foreign matter (having a particle size of from 0.5 to 1.0 μm) was only 880 pieces per gram of the aromatic polycarbonate.

EXAMPLES 2 to 4

Substantially the same procedure as in Example 1 was repeated, except that the velocities of molten polymers in pipes 7, 13, 15, 24, 33, 40 and 50 were changed as shown in Table 1. The $\overline{M}n$'s of the molten polymers in the pipes (as measured 300 hours after the start of the operation of the system of FIG. 1) were the same as those in Example 1. With respect to the aromatic polycarbonate withdrawn from wire-wetting fall polymerizer 42 after 300 hours from the start of the operation of the system of FIG. 1), the b* value thereof and the amount of foreign matter (having a particle size of 0.5 to 1.0 μm) contained therein were measured in accordance with the above-mentioned methods. Results are shown in Table 1.

Comparative Examples 1 to 3

Substantially the same procedure as in Example 1 was repeated, except that the velocities of molten polymers in pipes 7, 13, 15, 24, 33, 40 and 50 were changed as shown in Table 1. The $\overline{M}n$'s of the molten polymers in the pipes (as measured 300 hours after the start of the operation of the system of FIG. 1) were the same as those in Example 1. With respect to the aromatic polycarbonate withdrawn from wire-wetting fall polymerizer 42 after 300 hours from the start of the operation of the system of FIG. 1, the b* value thereof and the amount of foreign matter (having a particle size of 0.5 to 1.0 μm) contained therein were measured in accordance with the above-mentioned methods. Results are shown in Table 1.

EXAMPLE 5

Substantially the same procedure as in Example 1 was repeated, except that the inner wall of each of pipes 7, 13, 15, 24, 33, 40 and 50 was made of SUS304 L. The $\overline{\text{Mn}}$'s of the molten polymers in the pipes (as measured 300 hours after the start of the operation of the system of FIG. 1) were the same as those in Example 1. With respect to the aromatic polycarbonate withdrawn from wire-wetting fall polymerizer 42 after 300 hours from the start of the operation of the system of FIG. 1, the b* value thereof and the amount of foreign matter (having a particle size of 0.5 to 1.0 μm) contained therein were measured in accordance with the above-mentioned methods. As a result, the b* value of the aromatic polycarbonate was as small as 3.4, and the amount of foreign matter (having a particle size of from 0.5 to 1.0 μm) was only 920 pieces per gram of the aromatic polycarbonate.

EXAMPLE 6

Substantially the same procedure as in Example 1 was repeated, except that the inner wall of each of pipes 7, 13, 15, 24, 33, 40 and 50 was made of SUS316. The $\overline{\text{Mn}}$'s of the molten polymers in the pipes (as measured 300 hours after the start of the operation of the system of FIG. 1) were the same as those in Example 1. With respect to the aromatic polycarbonate withdrawn from wire-wetting fall polymerizer 42 after 300 hours from the start of the operation of the system of FIG. 1, the b* value thereof and the amount of foreign matter (having a particle size of 0.5 to 1.0 μm) contained therein were measured in accordance with the above-mentioned methods. As a result, the b* value of the aromatic polycarbonate was as small as 3.3, and the amount of foreign matter was only 900 pieces per gram of the aromatic polycarbonate.

EXAMPLE 7

Substantially the same procedure as in Example 1 was repeated except that the reaction pressure in second agitation type polymerizer vessel 26 was changed to 3 mmHg, and the pressure in horizontal twin-screw agitation type polymerizer 35 was changed to 0.6 mmHg. The $\overline{\text{Mn}}$'s of the molten polymers in the pipes (as measured 300 hours after the start of the operation of the system of FIG. 1) were the same as those in Example 1, except that the $\overline{\text{Mn}}$ of the molten polymer in pipe 33 was 2,800. With respect to the aromatic polycarbonate withdrawn from wire-wetting fall polymerizer 42 after 300 hours from the start of the operation of the system of FIG. 1, the b* value thereof and the amount of foreign matter (having a particle size of 0.5 to 1.0 μm) contained therein were measured in accordance with the above-mentioned methods. As a result, the b* value of the aromatic polycarbonate was as small as 3.3, and the amount of foreign matter was only 870 pieces per gram of the aromatic polycarbonate.

EXAMPLE 8

Substantially the same procedure as in Example 7 was repeated, except that the velocity of the molten polymer in pipe 33 was changed to 0.03 m/sec. The $\overline{\text{Mn}}$'s of the molten polymers in the pipes (as measured 300 hours after the start of the operation of the system of FIG. 1) were the same as those in Example 7. With respect to the aromatic polycarbonate withdrawn from wire-wetting fall polymerizer 42 after 300 hours from the start of the operation of the system of FIG. 1, the b* value thereof and the amount of foreign matter (having a particle size of 0.5 to 1.0 μm) contained therein were measured in accordance with the above-mentioned methods. As a result, the b* value of the aromatic polycarbonate was as small as 3.4, and the amount of foreign matter was only 890 pieces per gram of the aromatic polycarbonate.

EXAMPLE 9

Substantially the same procedure as in Example 1 was repeated, except that 1,1-bis-(4-hydroxyphenyl)-3,3,5-trimethylcyclohexane was used instead of bisphenol A. The $\overline{\text{Mn}}$'s of the molten polymers in pipes 7, 13, 15, 24, 33, 40, and 50 (as measured 300 hours after the start of the operation of the system of FIG. 1) were 340, 340, 340, 830, 2,300, 6,100, and 10,100, respectively. With respect to the aromatic polycarbonate withdrawn from wire-wetting fall polymerizer 42 after 300 hours from the start of the operation of the system of FIG. 1, the b* value thereof and the amount of foreign matter (having a particle size of 0.5 to 1.0 μm) contained therein were measured in accordance with the above-mentioned methods. As a result, the b* value of the aromatic polycarbonate was as small as 3.4, and the amount of foreign matter was only 980 pieces per gram of the aromatic polycarbonate.

TABLE 1

| | | Velocity (m/sec.) | | | | | | | Aromatic polycarbonate | |
|---|---|---|---|---|---|---|---|---|---|---|
| | | Number average molecular weight | | | | | | | | Foreign |
| | | less than 2500 | | | | 2500 or more | | | | substance |
| Pipe number | | 7 | 13 | 15 | 24 | 33 | 40 | 50 | b* value | (piece/g) |
| Examples | 1 | 0.09 | 0.1 | 0.1 | 0.08 | 0.06 | 0.02 | 0.02 | 3.3 | 880 |
| | 2 | 0.21 | 0.15 | 0.15 | 0.11 | 0.09 | 0.03 | 0.03 | 3.3 | 670 |
| | 3 | 0.15 | 0.28 | 0.28 | 0.05 | 0.05 | 0.04 | 0.01 | 3.4 | 780 |
| | 4 | 0.35 | 0.2 | 0.2 | 0.1 | 0.08 | 0.008 | 0.008 | 3.3 | 1,280 |
| Comparative | 1 | 0.04 | 0.03 | 0.03 | 0.03 | 0.03 | 0.02 | 0.03 | 4 | 950 |
| Examples | 2 | 0.09 | 0.1 | 0.1 | 0.08 | 0.06 | 0.004 | 0.003 | 3.3 | 3,850 |
| | 3 | 0.03 | 0.02 | 0.02 | 0.02 | 0.01 | 0.001 | 0.001 | 4.1 | 6,970 |

INDUSTRIAL APPLICABILITY

The method of the present invention is advantageous not only in that a high quality aromatic polycarbonate which is not only highly colorless, but also has a low foreign matter content can be easily produced by using an ordinary pipeline system which comprises one or more pipes made of an ordinary material, but also in that there is no need for a step of forcibly passing the aromatic polycarbonate (inherently having a high melt viscosity) through a polymer filter by using an extruder, which step is necessarily conducted in conventional techniques for the removal of foreign matter. Therefore, the aromatic polycarbonate obtained by the method of the present invention can be advantageously used in a wide variety of application fields, especially as a material for an optical disk substrate.

What is claimed is:

1. In a method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, said transesterification polymerization reaction being performed in two or more polymerizers which are connected through a pipeline system toward an outlet for a final aromatic polycarbonate product, wherein said pipeline system comprises two or more pipes through which a molten aromatic polycarbonate having a number average molecular weight increased by said transesterification polymerization reaction is passed while contacting an inner wall of the pipes, wherein at least one of said polymerizers is used for producing an aromatic polycarbonate having a number average molecular weight of less than 2,500 and at least one remaining polymerizer is used for producing an aromatic polycarbonate having a number average molecular weight of 2,500 or more, and wherein at least one of said pipes is used for passing the aromatic polycarbonate having a number average molecular weight of less than 2,500 in a molten state and at least one remaining pipe is used for passing the aromatic polycarbonate having a number average molecular weight of 2,500 or more in a molten state, the method comprises passing a molten aromatic polycarbonate having a number average molecular weight of less than 2,500 through at least one of said pipes at a velocity of 0.05 m/sec. or more and passing a molten aromatic polycarbonate having a number average molecular weight of 2,500 or more through at least one remaining pipe at a velocity of 0.005 m/sec. or more.

2. The method according to claim 1, wherein the inner wall of the pipe(s) is made of a material having an iron content of from 20 to 100% by weight.

3. The method according to claim 1 or 2, wherein the surface of the inner wall of the pipe(s) is washed with a liquid comprising an aromatic monohydroxy compound.

4. The method according to claim 3, wherein the aromatic monohydroxy compound is phenol.

5. The method according to claim 3, wherein said liquid is an aqueous solution or an organic solvent solution containing at least 10% by weight of an aromatic monohydroxy compound.

6. A method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, said transesterification polymerization reaction being performed in two or more polymerizers which are connected through a pipeline system toward an outlet for a final aromatic polycarbonate product, wherein said pipeline system comprises two or more pipes through which a molten aromatic polycarbonate having a number average molecular weight increased by said transesterification polymerization reaction is passed while contacting an inner wall of the pipes, wherein at least one of said polymerizers is used for producing an aromatic polycarbonate having a number average molecular weight of less than 2,500 and at least one remaining polymerizer is used for producing an aromatic polycarbonate having a number average molecular weight of 2,500 or more, and wherein at least one of said pipes is used for passing the aromatic polycarbonate having a number average molecular weight of less than 2,500 in a molten state and at least one remaining pipe is used for passing the aromatic polycarbonate having a number average molecular weight of 2,500 or more in a molten state, the method comprises passing a molten aromatic polycarbonate having a number average molecular weight of less than 2,500 through at least one of said pipes at a velocity of from 0.05 to 10 m/sec. and passing a molten aromatic polycarbonate having a number average molecular weight of 2,500 or more through at least one remaining pipe at a velocity of from 0.005 to 4 m/sec.

7. A method for producing an aromatic polycarbonate which comprises subjecting to a transesterification polymerization reaction at least one polymerizable material selected from the group consisting of:

a molten monomer mixture of an aromatic dihydroxy compound and a diaryl carbonate, and a molten prepolymer obtained by reacting an aromatic dihydroxy compound with a diaryl carbonate, said transesterification polymerization reaction being performed in two or more polymerizers which are connected through a pipeline system toward an outlet for a final aromatic polycarbonate product, wherein said pipeline system comprises two or more pipes through which a molten aromatic polycarbonate having a number average molecular weight increased by said transesterification polymerization reaction is passed while contacting an inner wall of the pipes, wherein at least one of said polymerizers is used for producing an aromatic polycarbonate having a number average molecular weight of less than 2,500 and at least one remaining polymerizer is used for producing an aromatic polycarbonate having a number average molecular weight of 2,500 to 100,000, and wherein at least one of said pipes is used for passing the aromatic polycarbonate having a number average molecular weight of less than 2,500 in a molten state and at least one remaining pipe is used for passing the aromatic polycarbonate having a number average molecular weight of 2,500 to 100,000 in a molten state, the method comprises passing a molten aromatic polycarbonate having a number average molecular weight of less than 2,500 through at least one of said pipes at a velocity of from 0.05 to 10 m/sec. and passing a molten aromatic polycarbonate having a number average molecular weight of 2,500 to 100,000 through at least one remaining pipe at a velocity of from 0.005 to 4 m/sec.

* * * * *